United States Patent [19]

Schumacher, II et al.

[11] Patent Number: 4,653,257
[45] Date of Patent: Mar. 31, 1987

[54] CUTTER FOR CUTTER-BAR MOWERS AND A PROCESS FOR PRODUCING IT

[76] Inventors: Gustav Schumacher, II, Gartenstrasse 8; Günter Schumacher, Raiffeisenstrasse 10, both of 5231 Eichelhardt, Fed. Rep. of Germany

[21] Appl. No.: 671,282

[22] Filed: Nov. 14, 1984

[30] Foreign Application Priority Data

Nov. 18, 1983 [DE] Fed. Rep. of Germany ....... 3341656

[51] Int. Cl.⁴ .................. A01D 55/10; B23K 31/04
[52] U.S. Cl. ................................... 56/298; 56/310
[58] Field of Search ................. 56/293, 307, 296, 310

[56] References Cited

U.S. PATENT DOCUMENTS 4,286,425  9/1981  Schumacher, II et al. .......... 56/307

Primary Examiner—Gene Mancene
Assistant Examiner—David I. Tarnoff
Attorney, Agent, or Firm—Steinberg & Raskin

[57] ABSTRACT

The invention relates to a cutter for cutter-bar mowers of harvesting machines, with a top cutter (1) and bottom cutter (2) stamped out of flat material and connected to one another in front of the blade gap (3) by projection welding, a layer of material (14) being applied by additional welding to the point of connection (12), directed towards the cutter tip, between the top cutter (1) and bottom cutter (2). The invention also relates to a process for producing such a cutter.

20 Claims, 9 Drawing Figures

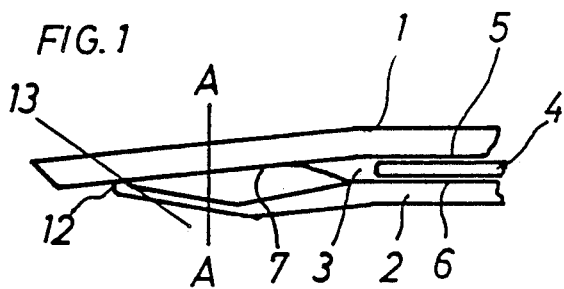
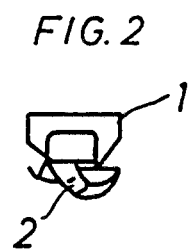
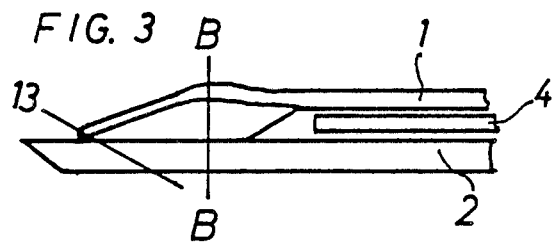
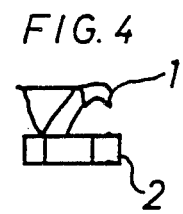
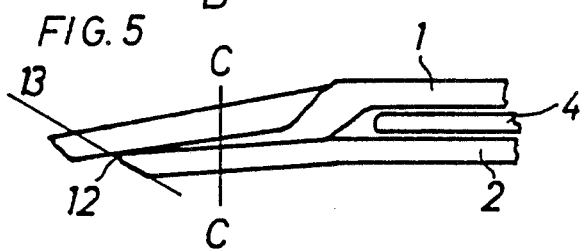
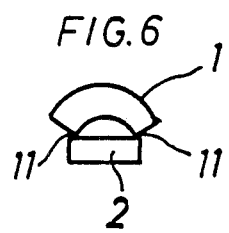
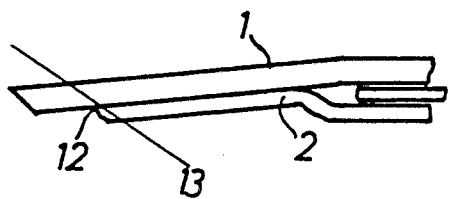
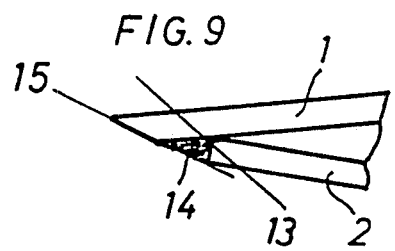

CUTTER FOR CUTTER-BAR MOWERS AND A PROCESS FOR PRODUCING IT

BACKGROUND OF THE INVENTION

The invention relates to a cutter for cutter-bar mowers of harvesting machines and to a process for producing it. Cutters for cutter-bar mowers are used in a wide variety of designs both as an individual cutter and as a multiple cutter. The most common cutters are those produced as drop forgings or as castings. They consist essentially of the stable cutter bottom part screwed at its rear end to the cutter-bar, the cutter tip tapering to a point and directed forwards, and the cutter lip or cutter top part which extends to the rear from the cutter tip and which forms with the cutter bottom part a gap in which the knife blade is moved to and fro. The cutter top part, also called a cutter lip, is connected firmly at one end to the cutter tip or is made in one piece with it. In most cases, the top part is formed when the knife-blade gap is milled out of the cutter forged as a whole.

Other embodiments of cutters for cutter-bar mowers are described in Australian Patent Specification No. 43,403/68 and in German Offenlegungsschrift No. 2,855,234.

They consist of stampings which have been obtained as a result of the stamping out of flat material of suitable thickness. Two or more stampings are connected to one another by means of welding, riveting or screwing to form an individual or multiple cutter (as a rule a double cutter). In such an embodiment, the cutter bottom part and cutter top part are connected in front of the blade gap, where the two parts rest flat on one another. This connecting region at the same time forms the cutter tip, whilst the other ends of the bottom cutter and top cutter are screwed to the cutter bar, that is to say behind the knife-blade gap. As a rule, the knife gap is formed as a result of the bending of either the top cutter or the bottom cutter or, if appropriate, both of these.

Although, in such a known embodiment, the form of the cutter tip tapering in the form of a wedge is of very stable design in a horizontal direction, nevertheless the stability is not very high in a vertical direction, in particular being based only on the material thickness of the cutter top part and cutter bottom part which are connected to one another in this region located in front of the knife gap.

This low stability in a vertical direction has a particularly adverse effect on the cutter tip. When the tip strikes against an obstacle under rough operating conditions in the field, such as, for example, a stone or other foreign bodies, the tip easily breaks off or is warped. Furthermore, as regards cutters to which grain lifters are fastened, the tips of the cutters are broken off very easily when a grain lifter is overloaded and thereby pulled downwards.

These single, double or multiple cutters produced from flat material, in which the cutter top part is extended up to the cutter bar and is fastened there in the same way as the cutter bottom part, have per se an extremely high stability both in a horizontal and in a vertical direction. As mentioned above, only the cutter tip constitutes a weak point.

In the applicant's own older patent application No. P 32 30 882.5, it is proposed, to eliminate this weak point, that the cutter top part and/or the cutter bottom part, which are produced from flat material, be shaped in front of the knife gap and then welded by suitable means. As a result of this shaping, the tip acquires very high stability.

According to a preferred embodiment, the top part of the cutter is straight and the bottom part is twisted. As a result, the bottom part acquires a sharp edge as a bearing point on the top part. This sharp edge is very well suited to be welded to the top part by means the so-called resistant projection welding. The edge represents as it were the projection necessary for welding.

In another embodiment, the top part is twisted and the bottom part is flat. In this case, welding is the same as in the opposite case mentioned above. In further exemplary embodiments, the tip of the cutter top part and/or the tip of the cutter bottom part has a crescent-shaped cross-section, so that there are always two edges available for resistance welding by the projection welding process.

It has now been shown that this welding results in a small joint at the cutter tip, and since this has a very disturbing effect on some types of grain or grass it has to be ground away. A relatively large amount of material has to be ground away in order to give the cutter tip the best possible shape.

A further disadvantage is that, because of the relatively thin components, case-hardening penetrates to a relatively great depth at the tip of the cutter, as a result of which the tip becomes very hard and the danger of breakage therefore increases.

On the other hand, attempts were also made to make the complete connection between the top cutter and bottom cutter by means of arc welding. However, a relatively large amount of welding material, that is to say electrode material, is required for closing the wedge-shaped gap at the tip of the cutter, so that this process is unsuitable for economic reasons.

SUMMARY OF THE INVENTION

The object of the present invention is now to provide a cutter for cutter-bar mowers, in which little additional grinding work is required and which has a very stable cutter tip.

This object according to the invention is achieved by means of a cutter for cutter-bar mowers of harvesting machines, with a top finger and bottom finger stamped out of flat material and connected to one another in front of the blade gap by means of projection welding, this cutter being defined in that a layer of material is applied as a result of additional welding to the point of connecting, directed towards the cutter tip, between the top cutter and bottom cutter.

Because of this layer of material, the grinding work becomes largely superfluous, and furthermore the applied material prevents case-hardening from penetrating to too great a depth and consequently prevents the danger that the cutter tip will break.

The layer of material can be applied according to any welding process, for example by means of oxyacetylene welding, arc welding or the like.

It has proved particularly expedient, in the cutter according to the invention, to apply the layer of material by means of additional arc welding using stick electrodes. It has also proved advantageous to apply it by means of additional arc welding using wire electrodes.

The invention also relates to a novel process for producing a cutter for cutter-bar mowers, such as is defined here above, in which a top cutter stamped out of flat material and a bottom cutter likewise stamped out of flat material are connected to one another in front of the blade gap by means of projection welding, this process being defined in that a layer of material is applied by means of additional welding to the point of connection, directed towards the cutter tip, between the top cutter and bottom cutter.

Such a layer of material is preferably applied by means of additional arc welding using stick or wire electrodes.

BRIEF DESCRIPTION OF THE DRAWINGS

The invention is explained in more detail below with reference to the exemplary embodiments illustrated in the attached drawings.

In the drawings:

FIG. 1: shows a cutter tip of a cutter with a twisted tip of the bottom cutter;

FIG. 2: shows a cross-section along the line A—A in FIG. 1;

FIG. 3: shows a cutter tip of a cutter with a twisted tip of the top cutter;

FIG. 4: shows a cross-section along the line B—B in FIG. 3;

FIG. 5: shows a cutter tip of a cutter with the top cutter having a tip with a crescent-shaped profile;

FIG. 6: shows a cross-section along the line C—C in FIG. 5;

FIG. 7: shows a plan view of a cutter tip of a cutter with a twisted tip of the top cutter according to FIG. 3;

FIG. 8: shows a cutter tip of a cutter with a non-profiled top cutter and bottom cutter;

FIG. 9: shows a cutter tip according to FIG. 1, but in which, by the process according to the invention, a layer of material is applied by means of arc welding, this filling the corner formed between the cutter top part and cutter bottom part.

DESCRIPTION OF THE PREFERRED EMBODIMENTS

In the exemplary embodiment illustrated in FIG. 1, as well as in all the other exemplary embodiments illustrated, the fastening of one end of the cutter to the cutter bar has been omitted for the sake of clarity. As a rule, the cutter is fastened in such a way that the end of the bottom cutter and the end of the top cutter extended up to the cutter bar are screwed to the cutter bar by means of the cutter-fastening screw. This method of fastening is obtained, for example, from the Australian Patent Specification mentioned in the introduction and from German Offenlegungsschrift No. 2,855,234.3-23.

Between the top cutter 1 and the bottom cutter 2 is located the blade gap 3 in which the mowing-knife blade 4 is moved to and fro. At the same time, the edges 5 and 6 form the opposing cutting edges for the mowing-knife blade 4. The top cutter 1 and bottom cutter 2 are welded to one another in front of the blade gap 3.

In the exemplary embodiment of the invention illustrated in FIG. 1, the tip of the bottom cutter is twisted by a specific angular amount in front of the blade gap. This results in the edge 7 which rests against the flat underside of the top cutter 1. This edge forms the welding contact, in a similar way to a projection provided in the material in the known resistance projection welding. When the top cutter 1 and bottom cutter 2 are now pressed against one another by means of appropriately shaped electrodes and the welding current is switched on, the edge 7 is then welded to the underside of the top part 1. Because the basic shape of the top cutter 1 and bottom cutter 2 tapers to a point, after the welded connection a cutter tip which is wedge-shaped both horizontally and vertically and which has high stability is obtained.

In the embodiment according to FIGS. 3 and 4, the top cutter 1 is twisted. An embodiment of this type can be advantageous for mowing machines in which the cutters are not inclined with their tip towards the ground, but are arranged in parallel or even with their tip pointing upwards.

In this case, welding can, of course, be carried out by means of the same projection welding process as in the first exemplary embodiment.

FIGS. 5 and 6 show a cutter tip with a cutter top part 1 having a crescent-shaped profile and with a flat cutter bottom part 2. In this case, the two edges 11 form the welding points for resistance welding. Instead of the top cutter 1, the bottom cutter 2 can also have a crescent-shaped profile, or else the top cutter 1 and the bottom cutter 2 can also both have a crescent-shaped profile.

FIG. 8 shows an exemplary embodiment in which neither the top cutter 1 nor the bottom cutter 2 are shaped. The two parts are likewise connected to one another by means of projection welding, one or more projections being pressed in the region of the bearing surfaces of the top cutter and bottom cutter.

It has been shown that, during welding by the resistance projection welding process, the outer tips of the top cutter 1 and bottom cutter 2 cannot be welded, because they are too thin and burn. For this reason, one part must be shorter than the counter piece to be welded to it. However, a shoulder 12 is formed at the same time.

In practice, this shoulder has a disturbing effect, because stalks cling to it and complete caps then form on the cutter tips.

It has now been shown that this disadvantage can be avoided if the cutter tip is ground down, for example along the line 13, after welding. However, this operation is very expensive since a considerable quantity of material has to be ground away in order to obtain the best possible cutter tip.

It has emerged that when a layer of material is applied in the shoulder 12 according to a welding process, preferably an arc welding process, there is very much less grinding work. Such a layer of material is illustrated at 14 in FIG. 9. It fills out the shoulder 12 and the grinding work is reduced according to the distance between the lines 13 and 15.

Thus, a cutter distinguished by excellent stability and breaking strength is obtained in a substantially more economical way as a result of the process according to the invention.

We claim:

1. A cutter for a cutter bar mower, comprising
   a top cutter member and a bottom cutter member, each stamped out of substantially flat material,
   one of said top and bottom cutter members being twisted around a longitudinal axis thereof,
   the other of said top and bottom cutter members comprising a longer front tip than said one of the top and bottom cutter members,
   both said cutter members being connected to one another at a point in front of a first blade gap formed therebetween by projection welding such that a second gap is formed between the respective front tips, and additionally comprising a layer of material applied by additional welding to the point of connection between said top cutter member and said bottom cutter member and being directed toward said longer front tip.

2. The cutter of claim 1, wherein said bottom cutter member is twisted and said top cutter member comprises said longer front tip.

3. The cutter of claim 1, wherein said top cutter member is twisted and said bottom cutter member comprises said longer front tip.

4. The cutter of claim 2, wherein said additional layer of material is applied by additional arc welding using stick electrodes or wire electrodes.

5. The cutter of claim 3, wherein said additional layer of material is applied by arc welding using stick electrodes or wire electrodes.

6. A cutter for a cutter bar mower, comprising
a top cutter member and bottom cutter member, one of which has a substantially crescent-shaped profile and a longer front tip than the other of said top and bottom cutter members,
both said cutter members being connected to one another at points in front of a first blade gap formed therebetween, by projection welding such that a second gap is formed between the respective front tips, and
additionally comprising a layer of material applied by additional welding to the points of connection between the top cutter member and the bottom cutter member and being directed toward said longer front tip.

7. The cutter of claim 6, wherein said top cutter member has said substantially crescent-shaped profile and longer tip.

8. The cutter of claim 6, wherein said bottom cutter member has said substantially crescent-shaped profile and longer tip.

9. The cutter of claim 7, wherein said layer of additional material is applied by additional arc welding using stick electrodes or wire electrodes.

10. The cutter of claim 8, wherein said additional layer of material is applied by additional arc welding using stick electrodes or wire electrodes.

11. A method for producing a cutter for a cutter-bar mower, comprising the steps of
stamping out a top cutter member and a bottom cutter member from substantially flat material,
twisting one of the top and bottom cutter members around a longitudinal axis thereof,
connecting the top and bottom cutter members at a point in front of a first blade gap formed between the two, by projection welding whereby the other of the top and bottom cutter members has a longer front tip than the one of the top and bottom cutters which has been twisted and a second gap is formed between the respective front tips, and
applying an additional layer of material by additional welding to the point of connection whereby the additional layer of material is directed towards the longer front tip.

12. The method of claim 11, wherein the bottom cutter member is twisted and the top cutter member has the longer front tip.

13. The method of claim 11, wherein the top cutter member is twisted and the bottom cutter member has the longer front tip.

14. The method of claim 12, wherein the additional layer of material is applied by additional arc welding using stick or wire electrodes.

15. The method of claim 13, wherein the additional layer of material is applied by additional arc welding using stick or wire electrodes.

16. A method for producing a cutter for a cutter-bar mower, comprising the steps of
stamping out a top cutter member and a bottom cutter member, one of which has a substantially crescent-shaped cross-section,
connecting the top and bottom cutter members at points in front of a first blade gap formed between the two, by projection welding whereby the cutter member having the substantially crescent-shaped cross-section has a longer front tip than the other of the top and bottom cutter members, and a second gap is formed between the respective front tips, and
applying an additional layer of material by additional welding to the points of connection whereby the additional layer of material is directed towards the longer front tip.

17. The method of claim 16, wherein the top cutter member has the substantially crescent-shaped cross-section and longer front tip.

18. The method of claim 16, wherein the bottom cutter member has the substantially crescent-shaped cross-section and longer front tip.

19. The method of claim 17, wherein the additional layer of material is applied by additional arc welding using stick or wire electrodes.

20. The method of claim 19, wherein the additional layer of material is applied by additional arc welding using stick or wire electrodes.

* * * * *